United States Patent
Den Hartog et al.

(10) Patent No.: US 9,276,970 B2
(45) Date of Patent: Mar. 1, 2016

(54) METHOD AND EQUIPMENT FOR FORWARDING A SIP REQUEST MESSAGE HAVING ALERTING INFORMATION ASSOCIATED THEREWITH TO A RECEIVING SUBSCRIBER IN A SIP BASED COMMUNICATIONS NETWORK

(75) Inventors: Jos Den Hartog, Capelle a/d Ijssel (NL); Rogier August Caspar Joseph Noldus, Goirle (NL)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 662 days.

(21) Appl. No.: 13/575,645

(22) PCT Filed: Jan. 28, 2010

(86) PCT No.: PCT/EP2010/051026
§ 371 (c)(1),
(2), (4) Date: Sep. 11, 2012

(87) PCT Pub. No.: WO2011/091848
PCT Pub. Date: Aug. 4, 2011

(65) Prior Publication Data
US 2013/0007293 A1    Jan. 3, 2013

(51) Int. Cl.
*G06F 15/16* (2006.01)
*H04L 29/06* (2006.01)

(52) U.S. Cl.
CPC ........ *H04L 65/1076* (2013.01); *H04L 65/1006* (2013.01); *H04L 65/1096* (2013.01)

(58) Field of Classification Search
CPC .................................................. H04L 29/08072
USPC .................................. 709/227, 228, 229, 230
See application file for complete search history.

(56) References Cited

U.S. PATENT DOCUMENTS

| | | | |
|---|---|---|---|
| 7,564,846 B2 * | 7/2009 | Dezonno et al. | 370/392 |
| 7,602,901 B1 * | 10/2009 | Kates et al. | 379/373.01 |
| 8,379,824 B2 * | 2/2013 | Jackson et al. | 379/207.16 |
| 8,885,639 B1 * | 11/2014 | Robbins | 370/353 |
| 2006/0177044 A1 * | 8/2006 | O'Neil et al. | 379/373.02 |
| 2008/0298354 A1 * | 12/2008 | Alves et al. | 370/389 |
| 2011/0119738 A1 * | 5/2011 | Piepenbrink et al. | 726/4 |

OTHER PUBLICATIONS

Rosenberg, J. et al. "SIP: Session Initiation Protocol." Network Working Group, Standards Track, RFC 3261, Jun. 2002, p. 164.

(Continued)

*Primary Examiner* — Hassan Kizou
*Assistant Examiner* — Abdelnabi Musa
(74) *Attorney, Agent, or Firm* — Coats & Bennett, PLLC

(57) ABSTRACT

Method and user equipment and network node for sending a SIP request message having alerting information associated therewith from an originating user equipment having an originating SIP-UA associated therewith to a receiving SIP-UA associated with a receiving user equipment in a SIP based communications network, including setting a condition which must be met in order for the receiving SIP-UA to be allowed to receive the alerting information, checking whether the condition has been met, and f the condition has been met, passing the alerting information on to the receiving SIP-UA.

19 Claims, 6 Drawing Sheets

(56) References Cited

OTHER PUBLICATIONS

Alexeitsev, D. "Alert-Info header URNs for Session Initiation Protocol (SIP); draft-alexeitsev-bliss-alert-info-urns-01." Internet Engineering Task Force (IETF), Standard working draft, Internet Society (ISOC) 4, Sep. 2, 2008, pp. 1-12.

Rescorla, E. "HTTP Over TLS," Network Working Group, RFC: 2818, Category: Informational, RTFM, Inc., East Palo Alto, CA, The Internet Society, May 2000, pp. 1-7.

* cited by examiner

METHOD AND EQUIPMENT FOR FORWARDING A SIP REQUEST MESSAGE HAVING ALERTING INFORMATION ASSOCIATED THEREWITH TO A RECEIVING SUBSCRIBER IN A SIP BASED COMMUNICATIONS NETWORK

TECHNICAL FIELD

The invention relates to a method and equipment, such as a user equipment or a network node, for forwarding a Session Initiation Protocol (SIP) message having alerting information associated therewith to a receiving subscriber in a SIP based communications network. More in general, the invention relates to a method, user equipment and network node for use in a Voice over Internet Protocol (VoIP) communications network, such as an Internet Protocol Multimedia Subsystem (IMS) network.

BACKGROUND

A Session Initiation Protocol (SIP) request message, such as a SIP Invite request message, can contain an Alert-Info header. The sender of the SIP request message can for instance provide a Uniform Resource Locator (URL), at which the intended receiver of the message can obtain a personalized ringtone.

SUMMARY

A call-forwarding service of a receiving subscriber can forward an incoming request message to another subscriber, e.g. a secretary. Herein "forwarding" denotes an action on a high (application) level, such as a call is forwarded from e.g. a B party to a C-party. This may pose a problem in the case the incoming request message has alerting information associated therewith. Maybe the sending subscriber does not intend the alerting information, e.g. a personalized ring tone, to be presented to another subscriber than the intended subscriber. So, the combination of a sending party service that sends a personalized ringtone and a receiving party service that performs call forwarding can pose a problem.

An object of the invention is to at least partially overcome the above problem. More in general, an object of the invention is to provide further versatility to a user of a Voice over Internet Protocol (VoIP) communications network.

Thereto, according to the invention is provided a method of sending a Session Initiation Protocol (SIP) request message having alerting information associated therewith from an originating user equipment having an originating Session Initiation Protocol User Agent (SIP-UA) associated therewith to a receiving SIP-UA associated with a receiving user equipment in a SIP based communications network, including setting a condition which must be met in order for the receiving SIP-UA to be allowed to receive the alerting information, checking whether the condition has been met, and only if the condition has been met, passing the alerting information on to the receiving SIP-UA.

It will be appreciated that the originating SIP-UA and originating user equipment will be associated with a calling subscriber and the receiving SIP-UA and receiving user equipment will be associated with a called subscriber. Herein "originating user equipment" and "receiving user equipment" denote the function of the respective user equipment in the above method, and do not exclude the respective user equipment to be usable for both originating and receiving calls. The same applies mutatis mutandis for "originating SIP-UA" and "receiving SIP-UA".

Thus, the sending party can make the delivery of the alerting information to a receiving subscriber conditional. Such condition may for instance be that the receiving subscriber is indeed the subscriber to which the SIP request message having the alerting information associated therewith was initially addressed. If the SIP request message is then forwarded to another receiving subscriber, such as a secretary, the alerting information may be prevented from being passed on to this unintended receiving subscriber.

Optionally, the condition and an Alert-Info header associated with the alerting information are included in the SIP request message. Hence, if the condition is met, the alerting information can immediately be passed on to the receiving subscriber.

Optionally, if the condition has not been met the Alert-Info header is removed from the SIP request message, and optionally if the condition has been met the condition is removed from the SIP request message. Hence, information that is at that time superfluous can be removed from the SIP request message.

Optionally, the Alert-Info header is not included in the SIP request message, and a SIP Update message including an Alert-Info header associated with the alerting information is sent to the receiving SIP-UA once it has been determined that the condition is met. Hence, the alerting information is provided by or on behalf of the calling party only when the condition is met.

Optionally, if the condition has not been met an http-server serving a Uniform Resource Locator (URL) corresponding to the alerting information is instructed not to handle said URL, and optionally to handle said URL in an alternative (e.g. a non-personalised or default) manner or to handle an alternative URL instead.

Optionally, the alerting information is made available via a hyper text transfer protocol uniform resource identifier (http-URI), or secure http-URI (https-URI), created to be used during the associated SIP session, and wherein an http(s)-server handling the http(s)-URI only delivers the alerting information associated with this http(s)-URI when the client requesting this alerting information to be delivered is authenticated by a certificate.

Optionally, the checking is performed by a SIP-UA residing in a user equipment, a SIP-UA residing in a network node, a proxy entity, such as a proxy call session control function (P-CSCF) associated with the receiving SIP-UA, a network node relaying the SIP request message to another subscriber than the originally addressed subscriber an Internet Protocol Multimedia Subsystem (IMS) service, a Personalised Ringtone service, an http-server handling the http-URI associated with the alerting information, and/or an https-server handling the https-URI associated with the alerting information.

Optionally, checking whether the condition has been met includes checking whether the receiving subscriber has a predetermined public user identity; checking whether the receiving subscriber has a public user identity within a predetermined domain; checking whether the receiving subscriber has a predetermined certificate; checking whether the P-asserted-identity (PAI) in a 180 Ringing or 183 Session progress is associated with a predetermined public user identity or domain; and/or checking whether no 181 Call is being forwarding (in the remainder of the document referred to as 181 Forwarded) has been received prior to 180 Ringing.

Optionally, an Interconnection Border Control Function (IBCF) entity checks whether the network associated with the originating subscriber has a trust relationship with the network associated with the receiving subscriber, and if no such trust relationship exists, removing the Alert-Info header and the associated condition from the SIP request message.

Optionally, the request message is a SIP Invite or a SIP Message.

The invention also relates to an equipment for sending a SIP request message having alerting information associated therewith to a receiving SIP-UA in a SIP based communications network, said equipment comprising a condition setting unit arranged for setting a condition which must be met in order for the receiving SIP-UA to be allowed to receive the alerting information.

The equipment may be arranged to set the condition such that the condition is not met by any receiving SIP-UA not intended or allowed to receive the alerting information.

Optionally, the setting unit is further arranged for including the condition, and optionally the Alert-Info header, in the SIP request message.

The invention also relates to an equipment for passing a SIP request message having alerting information associated therewith on to a receiving SIP-UA in a SIP based communications network, said equipment including a checking unit arranged for checking whether a predetermined condition associated with the alerting information has been met, and arranged for making the alerting information available to the receiving SIP-UA only if the predetermined condition has been met.

Optionally, the equipment comprises a removing unit which is arranged for, if the condition has not been met, removing from the SIP request message the Alert-Info header associated with the alerting information if said Alert-Info header is included in the SIP request message, and optionally arranged for, if the condition has been met, removing from the SIP request message the condition, if said condition is included in the SIP request message.

Optionally, the equipment is arranged for sending a SIP Update request message including an Alert-Info header associated with the alerting information to the receiving SIP-UA once it has been determined that the condition is met.

Optionally, the equipment is arranged for instructing, if the condition has not been met, an http-server serving a URL associated with the alerting information not to handle said URL, and optionally to handle the URL in a non-personalised (default) manner or handle an alternative URL instead.

The equipment may be one of, a user equipment, a SIP-UA, a proxy entity, such as a P-CSCF entity associated with the receiving SIP-UA, a network node relaying the SIP message to another receiving SIP-UA than the originally intended receiving SIP-UA, an IMS service, a Personalised Ringtone service, or an http-server serving the URL of the alerting information.

Thus, the invention also relates to a user equipment for receiving a SIP request message having alerting information and a condition associated therewith in a SIP based communications network, said user equipment comprising a checking unit arranged for checking whether the condition has been met, and arranged for making the alerting information available to a user of the user equipment only if the condition has been met.

Thus, the invention also relates to a network node for relaying a SIP request message having alerting information associated therewith to a receiving SIP-UA in a SIP based communications network, said network node including a condition setting unit arranged for setting a condition which must be met in order for the receiving SIP-UA to be allowed to receive the alerting information.

The invention also relates to a network node for relaying a SIP request message having alerting information associated therewith to a receiving SIP-UA in a SIP based communications network, said network node including a checking unit for checking whether a predetermined condition associated with the alerting information has been met, and only if the predetermined condition has been met passing the alerting information on to the receiving SIP-UA.

The invention further relates to a SIP request message comprising an Alert-Info header and a predetermined condition which must be met in order for a receiving SIP-UA to be allowed to receive the alerting information associated with the Alert-Info header.

Optionally, the SIP request message is a SIP Invite request message.

Optionally, the SIP request message comprises a conditional Alert-Info header and an unconditional Alert-Info header, wherein the conditional Alert-Info header is intended to be delivered to a receiving SIP-UA in the case that a predetermined condition is met, and wherein the unconditional Alert-Info header is intended to be delivered to the receiving SIP-UA in the case that the predetermined condition is not met.

BRIEF DESCRIPTION OF THE DRAWINGS

The invention will now be further elucidated by means of non-limiting examples referring to the drawing, in which.

DETAILED DESCRIPTION

Figure 1:
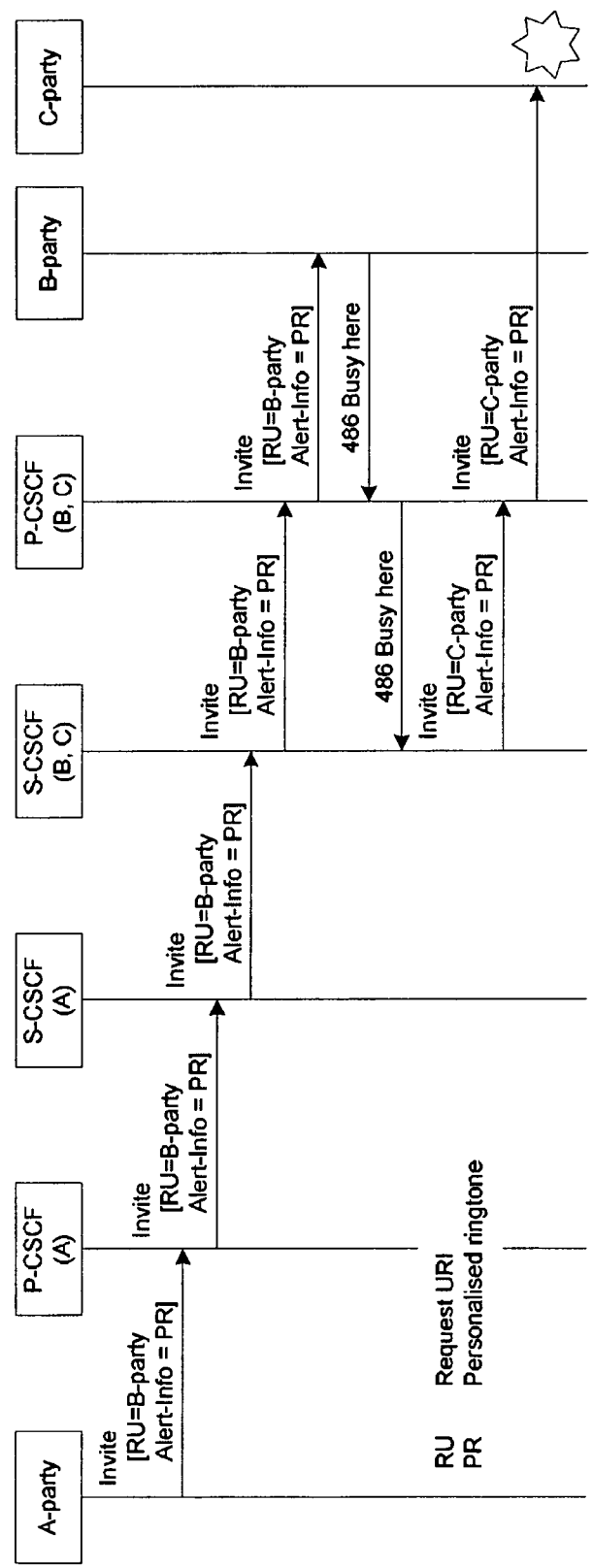
FIG. 1 shows a schematic representation of forwarding a personalised ringtone to a forwarded-to party according to the prior art.

FIG. 1 shows a schematic representation of forwarding a personalised ringtone to a forwarded-to party according to the prior art. In the example of FIG. 1, a sending A-party sends an Invite message to an intended receiving B-party. Hence, the request uniform resource identifier (R-URI) in the message is the B-party. The Invite message in this example comprises alerting information corresponding to a personalised ringtone PR. In this example, the Invite message is relayed by the proxy call session control function (P-CSCF) entity associated with the sending A-party, P-CSCF(A), and the Serving call session control function (S-CSCF) entity associated with the A-party, S-CSCF(A) to the S-CSCF entity associated with the intended receiving B-party, S-CSCF(B, C).

In this example, S-CSCF (B,C) represents the S-CSCF entity for the B-party as well as the S-CSCF entity for C-party. The same applies for P-CSCF (B, C). It is noted that the interrogating call session control function (I-CSCF) entity and home subscriber server (HSS) are not depicted, but are assumed to be understood by the informed reader.

In the example, the intended B-party does not answer the call, and the call is being forwarded to another receiving party, in this case the C-party. Call forwarding for the B-party may normally be done by an Application server (AS). An S-CSCF entity may, however, act as a forwarding proxy and forward the SIP Invite to an alternative destination when it receives 486 Busy here. FIG. 1 depicts forwarding by S-CSCF (B).

The star symbol in FIG. 1 depicts a possible problem: the C-party receives the Invite with the personalised ringtone, which was intended for the B-party. This problem equally applies to certain other SIP methods, such as SIP MESSAGE. The problem also exists for Alert-Info SIP header in INVITE response message or MESSAGE response message.

According to the present invention, the A-party or a service acting for the A-party indicates that the Alert-Info header in the SIP request message shall be handled conditionally. Further, the B-party or a service acting for the B-party may indicate that the Alert-Info header in the SIP response message shall be handled conditionally.

Figure 2:
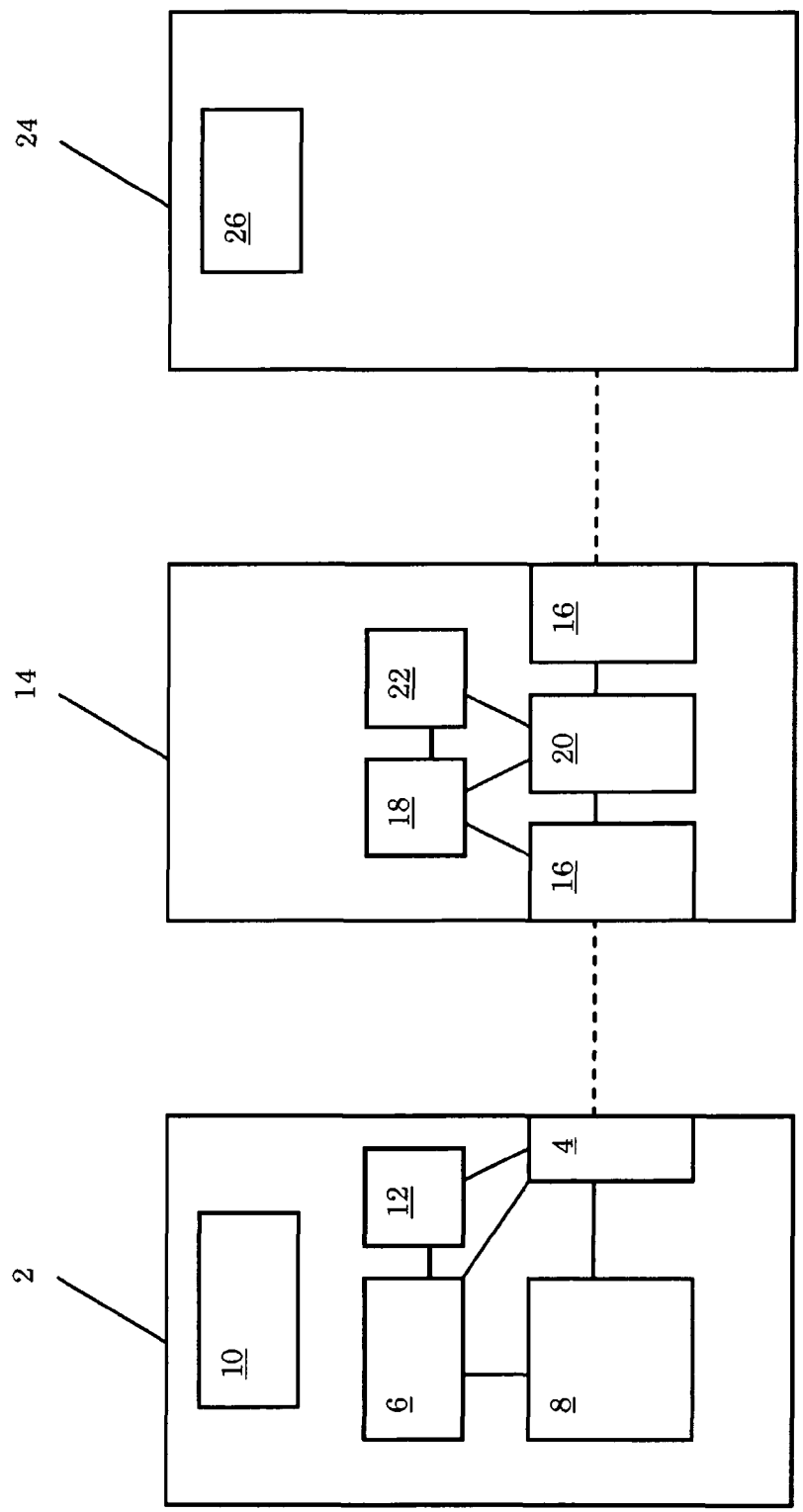
FIG. 2 shows a schematic representation of a system according to the invention.
Figure 3:
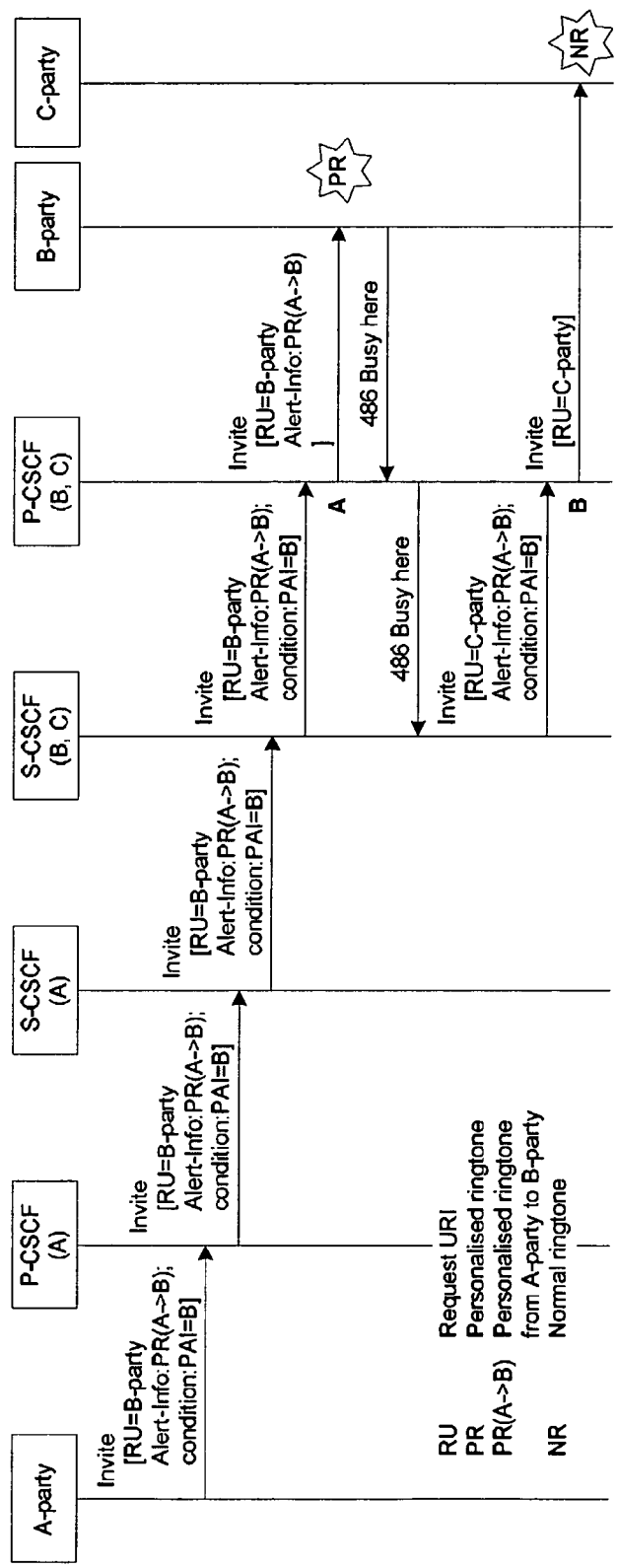
FIG. 3 shows a schematic representation of a first embodiment of the invention.

A first embodiment according to the invention will now be described referring to FIG. 2 and FIG. 3. FIG. 2 shows an example of a user equipment 2 according to the invention. The user equipment 2 includes an input-output unit 4 and a processing unit 6. In this example, the user equipment includes an including unit 8 for including the Alert-Info SIP header in the Invite request. FIG. 3 shows a schematic representation of a first embodiment according to the invention. In this example, the sending A-party initiates the sending of a SIP Invite request and includes an Alert-Info SIP header in the Invite request. It will be appreciated that it is also possible that the Alert-Info SIP header is included in the Invite request by a service acting for the A-party, i.e. a SIP application server (SIP-AS) invoked from the S-CSCF of the A-party.

In the example of FIG. 3, the sending A-party adds a delivery condition to the alerting information. Thereto, in this example the user equipment 2 of the A-party containing a SIP User Agent (SIP-UA) 10 comprises a condition setting unit 12. It is possible that the SIP-UA 10 includes the setting unit 12. In this example, the delivery condition is included in the SIP Invite request, e.g. by the condition setting unit 12. It will be appreciated that it is also possible that the condition is set by a condition setting unit of a service acting for the A-party, such as a SIP-AS. In this example the condition requires the P-asserted-identity (PAI) of the receiving subscriber to fulfil a predetermined criterion. For instance, the PAI may be required to be representative of the B-party.

The SIP Invite request is transmitted towards the intended receiving subscriber, here the B-party. The P-CSCF for the B-party, or a service acting for the B-party, checks whether the delivery condition is fulfilled. In the example of FIG. 2, the P-CSCF for the B-party is indicated at 14. It will be appreciated that this P-CSCF may include an input-output unit 16 and a processing unit 18. In this example, the P-CSCF for the B-party, or a service acting for the B-party, may include a checking unit 20. If the condition is met, the alerting information, here the personalised ringtone associated with the alerting information, is presented to the B-party, e.g. to a user equipment 24 containing a SIP-UA 26 of the B-party. If the condition is met, the condition may be removed from the SIP Invite, e.g. by a removing unit 22 of the P-CSCF 14. If the condition is not met, in this example the Alert-Info header is removed from the Invite request, e.g. by the removing unit 22. The B-party will then receive the Invite request without the Alert-Info header.

In this example, the SIP Invite request may be forwarded by or on behalf of the B-party to a C-party. In that case, the verification of the condition will be applied by the P-CSCF of this C-party, or a service acting for this C-party. If the condition is met, the alerting information, here the personalised ringtone associated with the Alert-Info header, is presented to the C-party. If the condition is not met, in this example the Alert-Info header is removed from the Invite request. The C-party will then receive the Invite request without the Alert-Info header.

It is noted that in this embodiment the A-party and the B-party are on the same IMS network, or that the A-party and B-party networks have a trust relationship. Thus, the A-party can be sure that the P-CSCF of the B-party, or the service acting for the B-party, performs the above-described check and acts accordingly. If the verification of the condition is applied by the P-CSCF of the C-party, or a service acting for the C-party, also the C-party should be on the same IMS network, or on a network having a trust relationship with the A-party network.

In an example according to this embodiment, the Invite request includes the Alert-Info header, containing some uniform resource locator (URL) which the A-party wants to be received by the intended B-party, but not by an other party. Thereto, the Alert-Info header contains the condition. The IMS network serving the calling party or the called party is responsible to ensure that this alerting information is provided to a receiving subscriber if this receiving subscriber satisfies the condition that is added to Alert-Info header. Example:

```
Invite sip:wendy.jones@provider.com SIP/2.0
Alert-Info: http://www.john.smith-private-content-server.com/my-
   alert-tone.wav; condition: P-asserted-id =
   sip:wendy.jones@provider.com.
```

When, in this example, the SIP Invite request is handled by a P-CSCF, e.g. a P-CSCF serving sip:wendy.jones@provider.com, the P-CSCF verifies that this SIP Invite is delivered to a SIP-UA that has sip:wendy.jones@provider.com as one of its IMS public user identities. That is to say, the SIP Invite sent from B-party's S-CSCF to B-party's P-CSCF will match a user profile in the P-CSCF. The P-CSCF checks whether the URI contained in the Alert-Info condition is contained in this user profile. If this is not the case, then this called party is apparently not entitled to receive this alerting information. This may be due to call forwarding (in which case it's the C-party receiving the Invite instead of the B-party). P-CSCF will not forward the alerting information to the called party if the condition is not met.

The condition may also contain a group identifier, such as ericsson.com. Example:

```
Invite tel:+31161249922 SIP/2.0
Alert-Info: http://www.ericsson-alert-tones/internal-alert.wav;
   condition: P-asserted-id = sip:ericsson.com.
```

In this example, the alerting information will be passed on to a called party or forwarded-to-party if that party has a Public user identity within the domain Ericsson.com. If tel:+31161249922 is the corporate number of Wendy Jones, then she will have that tel: URI in her user profile, but most likely also sip:wendy.jones@ericsson.com. The call arriving at the P-CSCF for Wendy Jones will have P-called-party-ID: tel:+31161249922. The profile of Wendy Jones contains also her SIP URI (sip:wendy.jones@ericsson.com), so the alerting information is delivered. If the call is forwarded to sip:alice.smith@ericsson.com, then the alerting information may be delivered to Alice, since the condition is also met for Alice Smith. If the call is forwarded to john.johnson@company.com, then the P-CSCF serving John Johnson will not forward the alerting information, since the forwarded-to-party does not fulfill the condition.

When the P-CSCF relays a SIP Invite to a SIP-UA and the Invite contains an Alert-Info header with a condition (and the condition was fulfilled), then the P-CSCF may remove the condition from the Alert-Info header. Thereto, the P-CSCF may include a removing unit. Rationale is that the condition was meant for network processing (P-CSCF) and is of no interest to the alerted party. This mechanism is depicted in FIG. 3. The annotation A shows the P-CSCF(B, C) determining that the condition for delivering the ringtone to the B-party is fulfilled; the condition is removed from the Alert-Info header in the Invite. Annotation B shows the P-CSCF(B, C) determining that the condition for delivering the ringtone to the C-party is not fulfilled; the Alert-Info header is removed from the SIP Invite.

With standardization, this mechanism may be used across IMS networks. Without standardization, the Alert-Info header with delivery condition would preferably be removed as soon as the Invite traverses trust boundaries between separate IMS networks; rationale is that it cannot be ensured in such case that the P-CSCF serving the destination subscriber (called party, forwarded-to-party) will apply the condition.

When the Alert-Info header is removed due to (i) the delivery condition not being met or (ii) the Invite request passing the trust boundary, the alerting info may revert to a default, non-personalised alerting information. Hereto, the SIP Invite request could contain two Alert-Info headers:
  one Alert-Info header pertaining to the personalized ringtone; this Alert-Info header has a condition associated with it;
  a second Alert-Info header, pertaining to the default, non-personalised ringtone; this Alert-Info header does not need to have a condition associated with it.
Example:

```
Invite tel:+31161249922 SIP/2.0
Alert-Info: http://www.ericsson-alert-tones/ericsson-internal-
   ringtone.wav; condition: P asserted-id = sip:ericsson.com
Alert-Info: http://www.ericsson-alert-tones/general-ringtone.wav.
```

When a B-party receives the Alert-Info header (because the condition was met), then it is the responsibility of that B-party to forward that Alert-Info header only to persons that are allowed to receive it, by means of adding a delivery condition to the Alert-Info header.

When a network node in the IMS network applies call forwarding, then that network node could already do the condition check and remove the Alert-Info header if the new target (forwarded-to-party in the request line) does not fulfill the condition. Thereto, the network node could include a checking unit and optionally a removing unit as described above.

In general, instead of having the P-CSCF associated with the B-party do the condition check, the check may also be done by an IMS service of the B-party. If the condition is fulfilled, the condition may be removed from the Alert-Info header; if condition is not fulfilled, the entire Alert-Info header may be removed from the Invite request.

Figure 4:
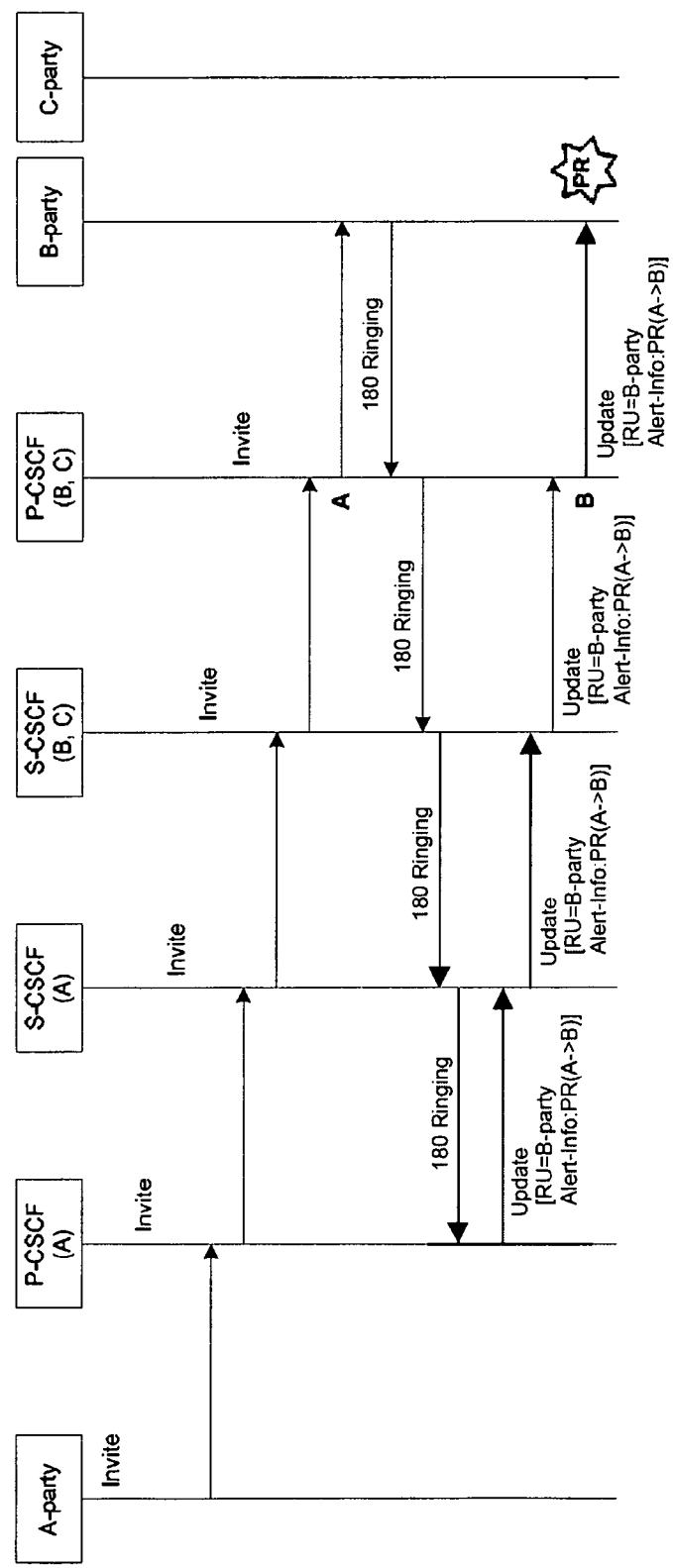
FIG. 4 shows a schematic representation of a second embodiment of the invention.

FIG. 4 shows a schematic representation of a second embodiment according to the invention. In this example, the A-party and the B-party are on the same network. It will be appreciated that it is also possible that the A-party and the B-party networks have a trust relationship. Thus, the A-party service can be sure that it always receives 181 Forwarded in the case of forwarding by or on behalf of the B-party.

In FIG. 4 a Personalised Ringtone (PR) service, acting on behalf of the A-party, waits for 180 Ringing and checks the P asserted-id (PAI) in the 180 Ringing; the PAI identifies the party that is now being alerted. If the PAI is acceptable according to condition set by the A-party, the PR service sends a SIP Update with Alert-Info header. The Update is sent within the same dialogue that is established with the 180 Ringing. The remote terminal of the B-party will use the Alert-Info header in the Update. The reception of the Alert-Info header, containing personalized ringtone from A-party replaces the playing of the standard ringtone. It will be appreciated that this requires that the B-party's terminal is capable of processing the Alert-Info header in Update.

Alternatively, the PR service may base the decision whether or not to send a SIP Update on whether or not forwarding had taken place. The PR service checks whether it had received one or more 181 Forwarded prior to 180 Ringing. If no forwarding had taken place, it sends Update with the Alert-Info header.

Alternative, the PR service may send an Alert-Info header in the Invite request. If the PR service detects that the actual receiver, as indicated in P-asserted-id in 180 Ringing, is the intended receiver (the condition is met), then no action is needed. If the PR service detects forwarding (i.e. 181 Forwarded received, condition not met), it notifies the http-server that serves the uniform resource locator (URL) of the Alert-Info header, that this URL should not be handled, but that a default, non-personalised ringtone shall be provided.

Figure 5:
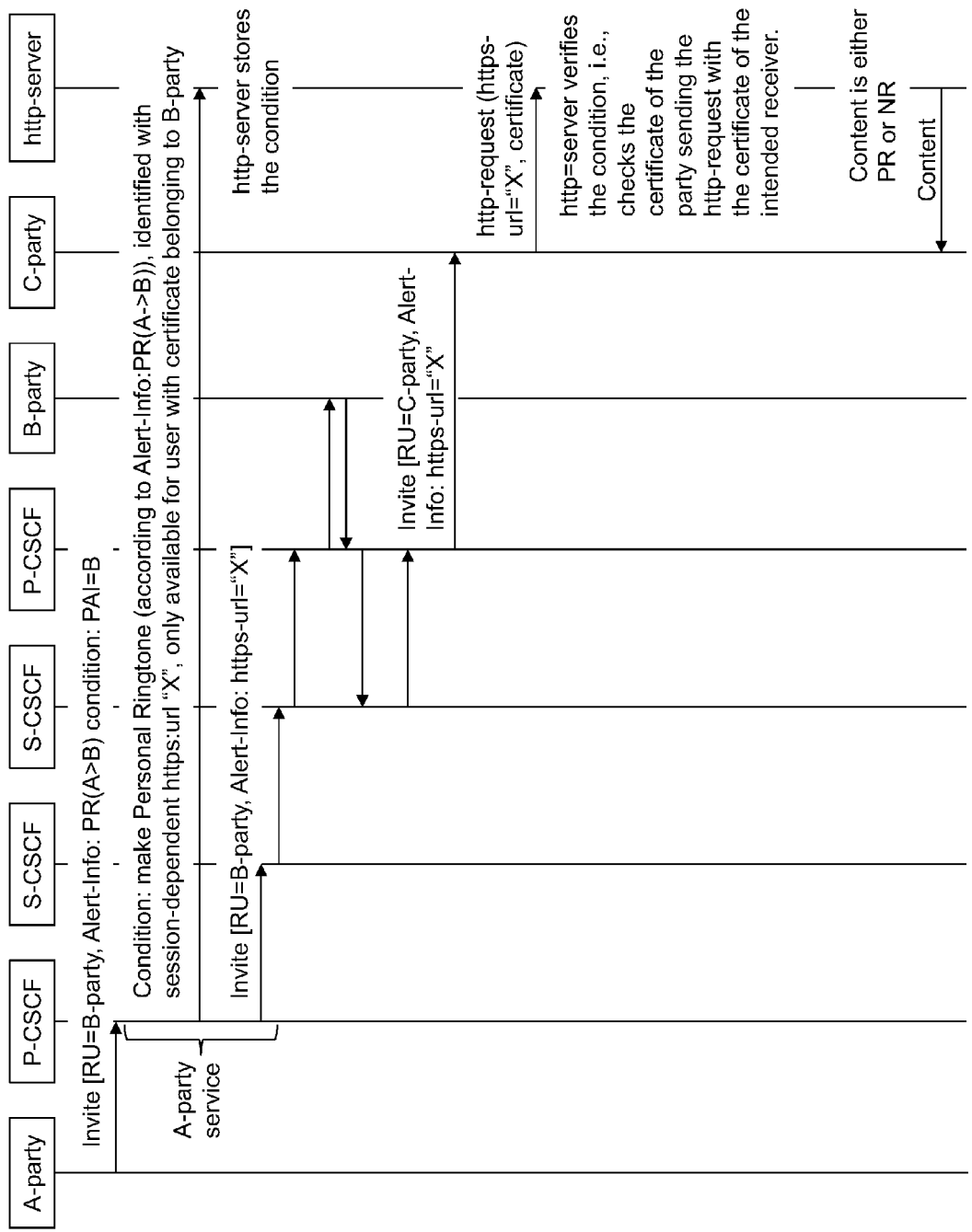
FIG. 5 shows a schematic representation of a third embodiment of the invention.

FIG. 5 shows a schematic representation of a third embodiment according to the invention.

The A-party service (that includes the Alert-Info header) specifies the URL with https. When a B-party fetches the content, using the https-URL, the identity of the B-party is checked. Only the intended B-party gets the content.

This example requires that the B-party has a certificate that is trusted by the A-party. Thereto, in this example, a certification authority hands out certificates belonging to SIP-URI's. The B-party User Equipment, or SIP-UA, installs the certificate(s) for the registered SIP-URI's. The A-party service (e.g. Personalized Ringtone) makes a ringtone available via an https-URI, here https-URI "X". This URI is, in this example, specifically created to be used during this SIP-session. The http-server handling this https-URI is instructed that this https-URI may be used only when the client is the intended receiver (identified by B-party SIP-URI, authenticated by the certificate). The A-party initiates a SIP-session and uses the Alert-Info parameter to offer the https-URI "X" to the B-party. The B-party SIP-client contacts the http-server to retrieve the alerting information. Because https is used, the https-server checks the client certificate (i.e. it checks whether the presented client certificate has been issued by the certification authority to the intended SIP-URI). If the client provides the correct certificate (condition is met), the content of the Personalized Ringtone is delivered. Otherwise (condition is not met), a default ringtone is delivered. The SIP-UA of the B-party will not notice any difference, as there will always content be provided. When a call is forwarded, and handled by a SIP-client belonging to another SIP-URI, a wrong certificate (or no certificate at all) is offered to the https-server and a default ringtone is played because the condition is not met.

The method of the invention may be used in combination with a Personalised ringtone service. The providing of a ringtone, or alerting information in general, in an initial SIP request message such as SIP Invite to the destination party is made conditional. The destination party will receive the alerting information only when a condition is fulfilled. The condition may be that the actual receiver of the SIP request message is the intended recipient. For a Personalised ringtone service, a calling subscriber may want to have certain ringtones offered only towards designated called parties. With the invention, a calling party can be sure that a Personalized Ringtone (PR) is provided only to the intended receiving party. In the case of forwarding to a party who is not entitled to receive the PR, the PR may be replaced by a standard, non-personalised ringtone.

The method of the invention may also be applied when the calling party is using a non-SIP terminal, such as GSM phone, in combination with IMS anchoring. In such case, the call from this calling party is anchored in the IMS network and will be subject to designated IMS services. One such designated IMS service may be a personalized ringtone service.

The method of the invention is described for usage with Invite, but is equally usable with Message.

In the foregoing specification, the invention has been described with reference to specific examples of embodiments of the invention. It will, however, be evident that various modifications and changes may be made therein without departing from the broader spirit and scope of the invention as set forth in the appended claims.

Figure 6:
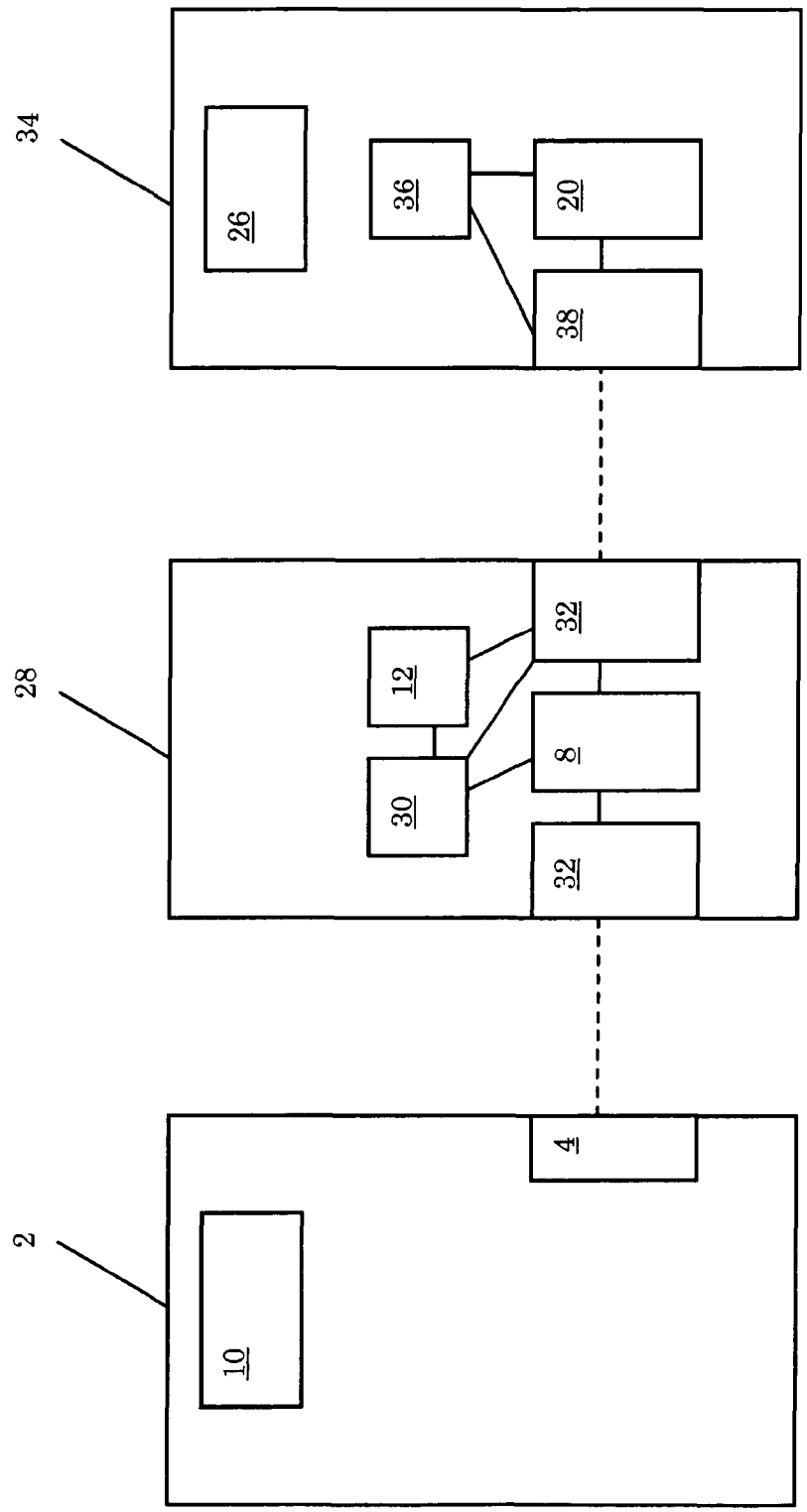
FIG. 6 shows an example of another system according to the invention.

In the example of FIG. 2 the including unit 8 and the condition setting unit 12 are included in the user equipment. It will be appreciated that alternatively, or additionally, the including unit and/or the condition setting unit may also be included in a network node 28 as shown in FIG. 6. In the example of FIG. 6, the network node also comprises a processing unit 30 and an input-output unit 32.

In the example of FIG. 2 the checking unit 20 and the removing unit 22 are included in the network node 14. It will be appreciated that alternatively, or additionally, the checking unit and/or the removing unit may also be included in a user equipment of the receiving party as shown in FIG. 6. The checking unit 20 may be included in the UA 26 residing in the user equipment 24 of the receiving party. In the example of FIG. 6, the user equipment 34 of the receiving party also comprises a processing unit 36 and an input-output unit 38.

It will be appreciated that the network node 14 of FIG. 2 may also cooperate with the network node 28 according to FIG. 6. It will be appreciated that the user equipment 2 of FIG. 2 may also cooperate with the user equipment 34 according to FIG. 6.

However, other modifications, variations, and alternatives are also possible. The specifications, drawings and examples are, accordingly, to be regarded in an illustrative rather than in a restrictive sense.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A method of sending a Session Initiation Protocol (SIP) request message having alerting information associated therewith from an originating user equipment having an originating SIP-User Agent associated therewith to a receiving SIP-User Agent associated with a receiving user equipment in a SIP based communications network, the method comprising:

setting a condition to be met by the receiving SIP-User Agent in order for the receiving SIP-User Agent to be allowed to receive the alerting information;

including the condition in the SIP request message;

checking whether the condition has been met by the receiving SIP-User Agent; and if the condition has been met, passing the alerting information on to the receiving SIP-User Agent, wherein a SIP Update message including an Alert-Info header associated with the alerting information is sent to the receiving SIP-User Agent once it has been determined that the condition is met.

2. The method according to claim 1 wherein the SIP request message includes an Alert-Info header associated with the alerting information.

3. The method according to claim 2 wherein the Alert-Info header and the condition are removed from the SIP request message if the condition has not been met.

4. The method according to claim 2 wherein the condition is removed from the SIP request message if the condition has been met.

5. The method according to claim 1:
wherein no Alert-Info header associated with the alerting information is included in the SIP request message.

6. The method according to claim 1, wherein an http-server serving a Uniform Resource Locater corresponding to the alerting information is instructed not to handle the Uniform Resource Locater if the condition has not been met.

7. The method according to claim 6, wherein, if the condition has not been met, the http-server is instructed to handle the Uniform Resource Locater in an alternative manner or to handle an alternative Uniform Resource Locater.

8. The method according to claim 1:
wherein the alerting information is made available via an http-Uniform Resource Identifier created to be used during the associated SIP session;
wherein an http-server handling the http-Uniform Resource Identifier delivers the alerting information associated with this the http-Uniform Resource Identifier only when the client requesting this alerting information to be delivered is authenticated by a certificate.

9. The method according to claim 1 wherein the checking whether the condition has been met is performed by at least one of:
a SIP-User Agent executed at a user equipment;
a SIP-User Agent executed at a network node;
a proxy entity associated with the receiving SIP-User Agent;
a network node forwarding the SIP request message to another receiving SIP-User Agent than the originally addressed receiving SIP-User Agent;
an Internet Protocol Multimedia Subsystem service;
a Personalized Ringtone service;
an http-server serving the Uniform Resource Locator associated with the alerting information;
an http-server handling the http-Uniform Resource Identifier associated with the alerting information; and
a secure http-server handling a secure http-Uniform Resource Identifier associated with the alerting information.

10. The method according to claim 1 wherein the checking whether the condition has been met comprises:
checking whether the receiving SIP-User Agent has a predetermined public user identity associated therewith;
checking whether the receiving SIP-User Agent has a public user identity within a predetermined domain associated therewith;

checking whether a P-Asserted Identity in a 180 Ringing or 183 Session progress is associated with a predetermined public user identity or domain; and checking whether no 181 Forwarded has been received prior to 180 Ringing.

11. An equipment for sending a Session Initiation Protocol (SIP) request message having alerting information associated therewith to a receiving SIP-User Agent in a SIP based communications network, the equipment comprising:

a condition setting circuit configured to set a condition to be met by the receiving SIP-User Agent in order for the receiving SIP-User Agent to be allowed to receive the alerting information;

wherein the condition setting circuit is further configured to include the condition in the SIP request message;

wherein the equipment is configured to send a SIP Update message including an Alert-Info header associated with the alerting information to the receiving SIP-User Agent once it has been determined that the condition is met.

12. The equipment according to claim 11 wherein the condition setting circuit is further configured to include an Alert-Info header associated with the alerting information in the SIP request message.

13. The equipment according to claim 11 wherein the equipment is configured to instruct an http-server serving a Uniform Resource Locator associated with the alerting information not to handle the Uniform Resource Locator if the condition has not been met.

14. The equipment according to claim 11 wherein the equipment comprises one of:
   a user equipment;
   a SIP-User Agent;
   a proxy entity associated with the receiving SIP-User Agent;
   a network node forwarding the SIP message to another receiving SIP-User Agent than the originally intended receiving SIP-User Agent;
   an Internet Protocol Multimedia Subsystem service;
   a Personalized Ringtone service; and
   an http-server serving the Uniform Resource Locator associated with the alerting information.

15. An equipment for passing a Session Initiation Protocol (SIP) request message having alerting information associated therewith on to a receiving SIP-User Agent in a SIP based communications network, the equipment comprising:

a checking circuit configured to check whether a predetermined condition, included in the SIP request message and associated with the alerting information, has been met by the receiving SIP-User Agent, and further configured to make the alerting information available to the receiving SIP-User Agent only if the predetermined condition has been met;

wherein the equipment is configured to send a SIP Update message including an Alert-Info header associated with the alerting information to the receiving SIP-User Agent once it has been determined that the condition is met.

16. The equipment according to claim 15, further comprising a removing circuit configured to remove an Alert-Info header associated with the alerting information from the SIP request message if:
   the Alert-Info header is included in the SIP request message; and
   the condition has not been met.

17. The equipment according to claim 16 wherein the removing circuit is further configured to remove the condition from the SIP request message if:
   the condition has been met; and
   the condition is included in the SIP request message.

18. The equipment according to claim 15 configured to instruct an http-server serving a Uniform Resource Locator associated with the alerting information not to handle the Uniform Resource Locator if the condition has not been met.

19. The equipment according to claim 15 wherein the equipment comprises one of:
   a user equipment;
   a SIP-User Agent;
   a proxy entity associated with the receiving SIP-User Agent;
   a network node forwarding the SIP message to another receiving SIP-User Agent than the originally intended receiving SIP-User Agent;
   an Internet Protocol Multimedia Subsystem service; a Personalized Ringtone service; and an http-server serving the Uniform Resource Locator associated with the alerting information.

* * * * *